US007916778B2

(12) United States Patent
Sahinoglu et al.

(10) Patent No.: US 7,916,778 B2
(45) Date of Patent: Mar. 29, 2011

(54) CONSTRUCTING AN ENERGY MATRIX OF A RADIO SIGNAL

(75) Inventors: Zafer Sahinoglu, Arlington, MA (US); Fatih M. Porikli, Watertown, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 592 days.

(21) Appl. No.: 11/577,143

(22) PCT Filed: Apr. 22, 2005

(86) PCT No.: PCT/US2005/013840
§ 371 (c)(1),
(2), (4) Date: Apr. 12, 2007

(87) PCT Pub. No.: WO2006/112850
PCT Pub. Date: Oct. 26, 2006

(65) Prior Publication Data
US 2009/0028221 A1     Jan. 29, 2009

(30) Foreign Application Priority Data
Apr. 15, 2005   (WO) ................ PCT/US2005/013035

(51) Int. Cl.
*H04B 3/46*     (2006.01)
*H04B 1/00*     (2006.01)

(52) U.S. Cl. ........................................ 375/224; 375/138
(58) Field of Classification Search .................. 375/138, 375/224, 130
See application file for complete search history.

(56) References Cited

U.S. PATENT DOCUMENTS

| | | | | |
|---|---|---|---|---|
| 4,745,546 A * | 5/1988 | Grinberg et al. | ................ | 712/11 |
| 5,400,362 A * | 3/1995 | Chennakeshu et al. | ....... | 375/285 |
| 5,450,612 A * | 9/1995 | Chanroo et al. | ............... | 340/7.2 |
| 5,537,434 A * | 7/1996 | Persson et al. | ................ | 375/134 |
| 6,039,701 A * | 3/2000 | Sliwa et al. | ................... | 600/588 |
| 6,442,202 B1 * | 8/2002 | Borer | ...................... | 375/240.16 |
| 2003/0218696 A1 * | 11/2003 | Bagga et al. | .................. | 348/700 |
| 2004/0091019 A1 * | 5/2004 | Chen et al. | ................... | 375/144 |
| 2005/0149300 A1 * | 7/2005 | Ruchti et al. | ..................... | 703/2 |
| 2005/0254553 A1 * | 11/2005 | Yao et al. | ...................... | 375/130 |
| 2006/0064726 A1 * | 3/2006 | Loner | ............................ | 725/68 |

* cited by examiner

*Primary Examiner* — David C Payne
*Assistant Examiner* — Brian J Stevens
(74) *Attorney, Agent, or Firm* — Dirk Brinkman; Gene Vinkur

(57) ABSTRACT

A method analyzes a radio signal received via a wireless channel. The radio signal includes multiple frames representing a transmitted symbol. Energy of each frame is sampled during multiple of non-overlapping time windows. The sampled energies are stored in an energy matrix indexed by the number of frames and the number of time windows in each frame to analyze the radio signal.

28 Claims, 19 Drawing Sheets

Invention

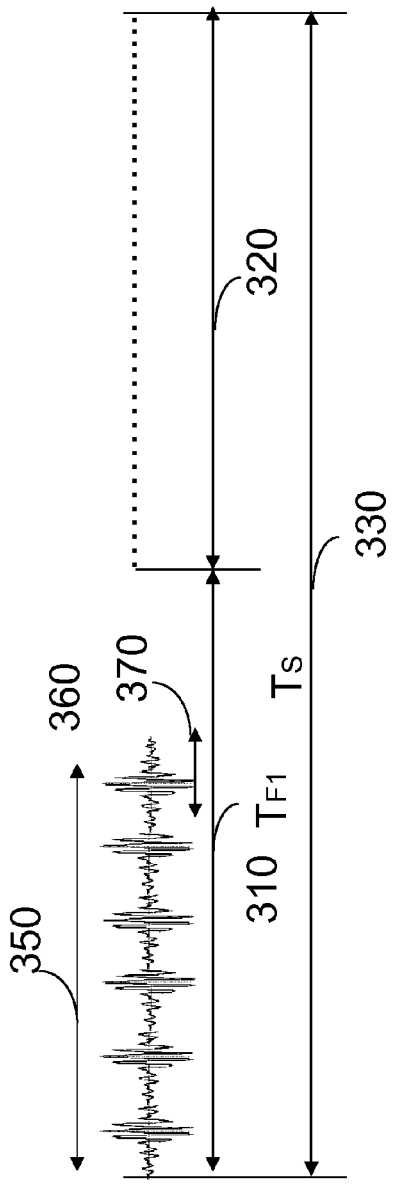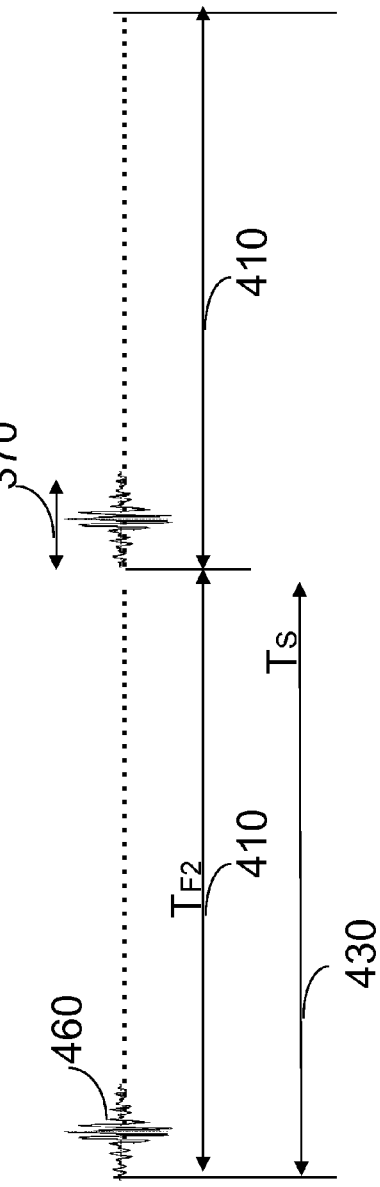

US 7,916,778 B2

CONSTRUCTING AN ENERGY MATRIX OF A RADIO SIGNAL

RELATED APPLICATION

This application is related to U.S. patent application Ser. No. 11/577,106, "Method and System for Estimating Time of Arrival of Signals Using Multiple Different Time Scales," filed by Sahinoglu on 12 Apr. 2007, claiming priority to PCT/US05/13035 filed, Apr. 15, 2005, both incorporate herein by reference.

FIELD OF THE INVENTION

The present invention relates generally to radio communication systems, and more particularly to constructing an energy matrix to further analyze the radio signal.

BACKGROUND OF THE INVENTION

Ranging

To estimate a distance between a transmitter and a receiver in a wireless communications network, the transmitter sends a signal to the receiver at a time instant $t_1$ according to a clock of the transmitter. After receiving the signal, the receiver immediately returns a reply signal to the transmitter. The transmitter measures a time of arrival (TOA) of the reply signal at a time $t_2$. An estimate of the distance between the transmitter and the receiver is the time for the signal to make the round trip divided by two and multiplied by the speed of light c, i.e., $$\text{Distance} = \frac{|t_1 - t_2|}{2} c.$$

This is also known as two-way 'ranging'.

Ultra Wideband

Ultra wideband signals are drastically different from conventional wireless signals. Not only is the signal spread over a huge frequency range, but the pulses in the signal are also spread out over time. An ultra wideband (UWB) signal is defined as an impulse radio signal with an absolute bandwidth larger than 500 MHz. or a relative bandwidth larger than 20%.

However, as the bandwidth of the UWB signal increases, the signal is less spread in time and a rising edge of the received signal becomes sharper. In precision ranging applications, detecting the arrival time of the rising edge of the received signal at desired accuracies is important. Therefore, it is desired to use UWB signals to provide precise positioning capabilities.

Extremely accurate TOA and position estimation is possible in a single user, line-of-sight (LOS) and single-path environment. However, in a practical setting, multi-path propagation, multi-user interference (MUI) and non-line-of-sight (NLOS) propagation make accurate positioning challenging. When the LOS between a reference node and a target node is blocked, only the reflections of the UWB signal, due to scattering effects, reach the target node. Therefore, the arrival time of the reflected signal does not represent the true TOA. Because the reflected signal travels a longer distance, a positive bias called a NLOS error is included in a measured time delay.

Detection of TOA of a radio frequency (RF) signal is equivalent to the detection of a leading edge of received multi-path components of the signal. Typically, power delay profiles (PDP) of UWB channels are represented by a double exponentially decaying model. On the other hand, individual multi-path components are subject to Nakagami fading. Depending on the environment, the leading edge that is detected may or may not be a sharp edge.

In the prior art, a transmitter sends a signal to a receiver over a wireless radio communications channel. The receiver measures the time of arrival of the received signal. That signal can be described as follows.

As shown in FIG. 3, a symbol waveform 350 includes multiple pulses 360. The waveform is transmitted in a frame interval $T_{F1}$ 310. A next frame 320, which contains no signal, can be an OFF interval. The pulses 360 in the waveform 350 can have positive or negative polarities depending on the information bit to be transmitted. A width 370 of each pulse can be in the order of pico or nanoseconds for ultra-wideband signals. Associated with the symbol is a symbol time $T_S$ 330.

As shown in FIG. 4, an alternative symbol waveform includes a single pulse 460, which is transmitted in a frame interval $T_{F2}$ 410 with an associated symbol time $T_S$ 430. The transmitted pulse 460 can have a positive or negative polarity depending on the information bit to be conveyed.

FIG. 1 shows a typical prior art communications network with a transmitter 100 and a receiver. The transmitter sends a signal 150 to the receiver.

As shown in FIG. 7, the receiver is a stored-reference or 'coherent' receiver 700. The coherent receiver includes a pre-filter 715 and a matched filter 730 serially connected. The pre-filter includes a low noise amplifier (LNA) 710, and a band-pass filter (BPF) 720. Then, in the matched filter, an output of the band-pass filter 720 is multiplied 722 with a template signal 724, which is equivalent to the corresponding transmitted signal waveform 105, and a resulting product is integrated 725. The output of the integrator 725 is entered into a sampling circuitry 735, which samples the output of the integrator to generate discrete observation samples 136 to be used by a time of arrival estimator 750.

Edge detection techniques are applied to the signal returned by the matched filter 730. In the matched filter operation 730, the time shifted template 724 that produces the maximum correlation with the received signal is used, and the highest peak at the output of 736 is considered as the TOA estimate.

The time shift is adaptively adjusted. In other words, correlations of the received signal with shifted versions of a template signal are considered. In a single path channel, the transmitted waveform can be used as an optimal template signal, and conventional correlation-based estimation can be employed. However, in the presence of an unknown multi-path channel, the optimal template signal becomes the received waveform, which is the convolution of the transmitted waveform and the channel impulse response.

Therefore, the correlation of the received signal with the waveform template is suboptimal in a multi-path channel. If that suboptimal technique is employed in a narrowband system, then the correlation peak may not give the true TOA because multiple replicas of the transmitted signal partially overlap due to multi-path propagation.

In order to prevent this effect, super-resolution time delay estimation techniques have been described, M.-A. Pallas and G. Jourdain, "Active high resolution time delay estimation for large BT signals," IEEE Transactions on Signal Processing, vol. 39, issue 4, pp. 781-788, April 1991. However, those techniques are too complex to perform real time, and requires a large amount of memory.

For some of the matched filter based prior art see: W. Chung and D. Ha, "An accurate ultra wideband (UWB) ranging for precision asset location," Proc. IEEE Conf. Ultrawideband Syst. Technol. (UWBST), pp. 389-393, November 2003; B. Denis, J. Keignart, and N. Daniele, "Impact of NLOS propagation upon ranging precision in UWB systems," Proc. IEEE Conf. Ultrawideband Syst. Technol. (UWBST), pp. 379-383, November 2003; and K. Yu and I. Oppermann, "Performance of UWB position estimation based on time-of-arrival measurements," Proc. IEEE Conf. Ultrawideband Syst. Technol. (UWBST), pp. 400-404, May 2004.

Even though matched filtering is optimum for leading detection technique, it faces practical problems in implementation. Matched filtering requires extremely high sampling rates, which is very difficult for UWB systems.

Because the shapes of pulses can be different at various multi-path arrivals, it is very difficult to match the template pulse of the typically analog correlator to the received shape. Also, it is very difficult to synchronize to each individual multi-path component, which means a loss in the total collected energy. Due to the large bandwidth of the UWB signal, multi-path components are usually resolvable without the use of complex algorithms.

However, the correlation peak at the output of the matched filter will still not necessarily give the true TOA because the first multi-path component is not always the strongest component.

FIG. 8 shows a coherent receiver 800 with a pre-filter process 715 as described above. Here, the output of the pre-filter is provided to a square-law device 810 that takes the square of the input signal and integrates 725 the square. The output of the integrator 725 is sampled 735, and TOA estimation 750 is performed.

The sampling circuit uses a sampling interval of $t_s$, which is equal to a block length $T_B$. The output of the integrator 725 are observation samples z(n), as analytically expressed as:

$$z[n] = \sum_{j=1}^{N_Q} \int_{(j-1)T_f + (c_j + n - 1)T_b}^{(j-1)T_f + (c_j + n)T_b} |r(t)|^2 \, dt.$$

SUMMARY OF THE INVENTION

A method analyzes a radio signal received via a wireless channel. The radio signal includes multiple frames representing a transmitted symbol. Energy of each frame is sampled during multiple of non-overlapping time windows. The sampled energies are stored in an energy matrix indexed by the number of frames and the number of time windows in each frame to analyze the radio signal.

BRIEF DESCRIPTION OF THE DRAWINGS

FIG. 3 is a prior art signal waveform including multiple pulses for each transmitted symbol;

FIG. 4 is a prior art signal waveform including a single pulse for each transmitted symbol;

DETAILED DESCRIPTION OF THE PREFERRED EMBODIMENT

Figure 2:
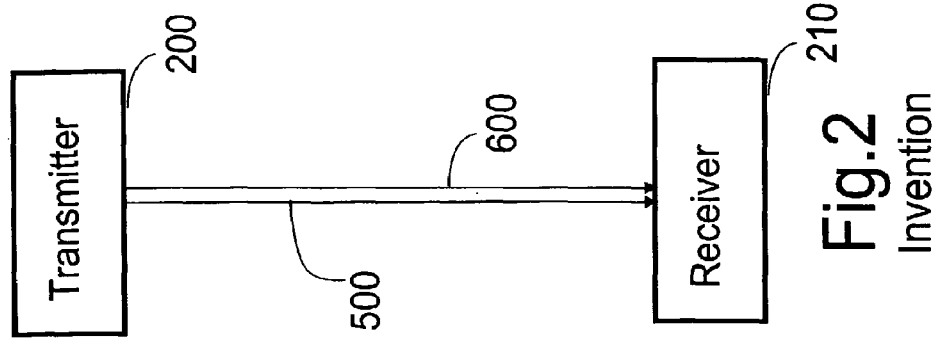
FIG. 2 is a block diagram of signal transmission from a transmitter device to a receiver device to perform ranging according to the invention.
Figure 1:
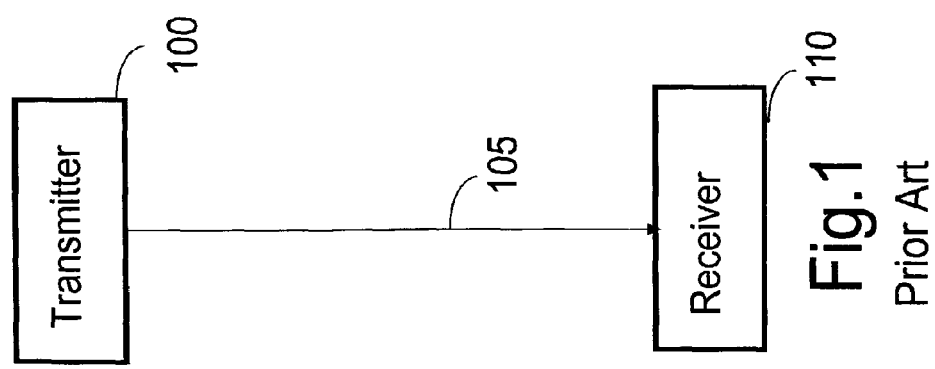
FIG. 1 is a block diagram of a prior art signal transmission from a transmitter to a receiver device to perform ranging.

FIG. 2 shows a communications network with a transmitter 200 and a receiver 210 according to the invention. The transmitter sends a signal 500 or 600 according to the invention to the receiver. In the case of the signal 500 the receiver 210 is coherent, and in the case of signal 600 the receiver is non-coherent.

Signal Model

In general, a received signal according to the invention is one of either a narrowband, wideband or ultra-wideband signal (UWB). In the preferred embodiment, the received signal is a time-hopped impulse-radio signal (TH-IR).

Figure 5:
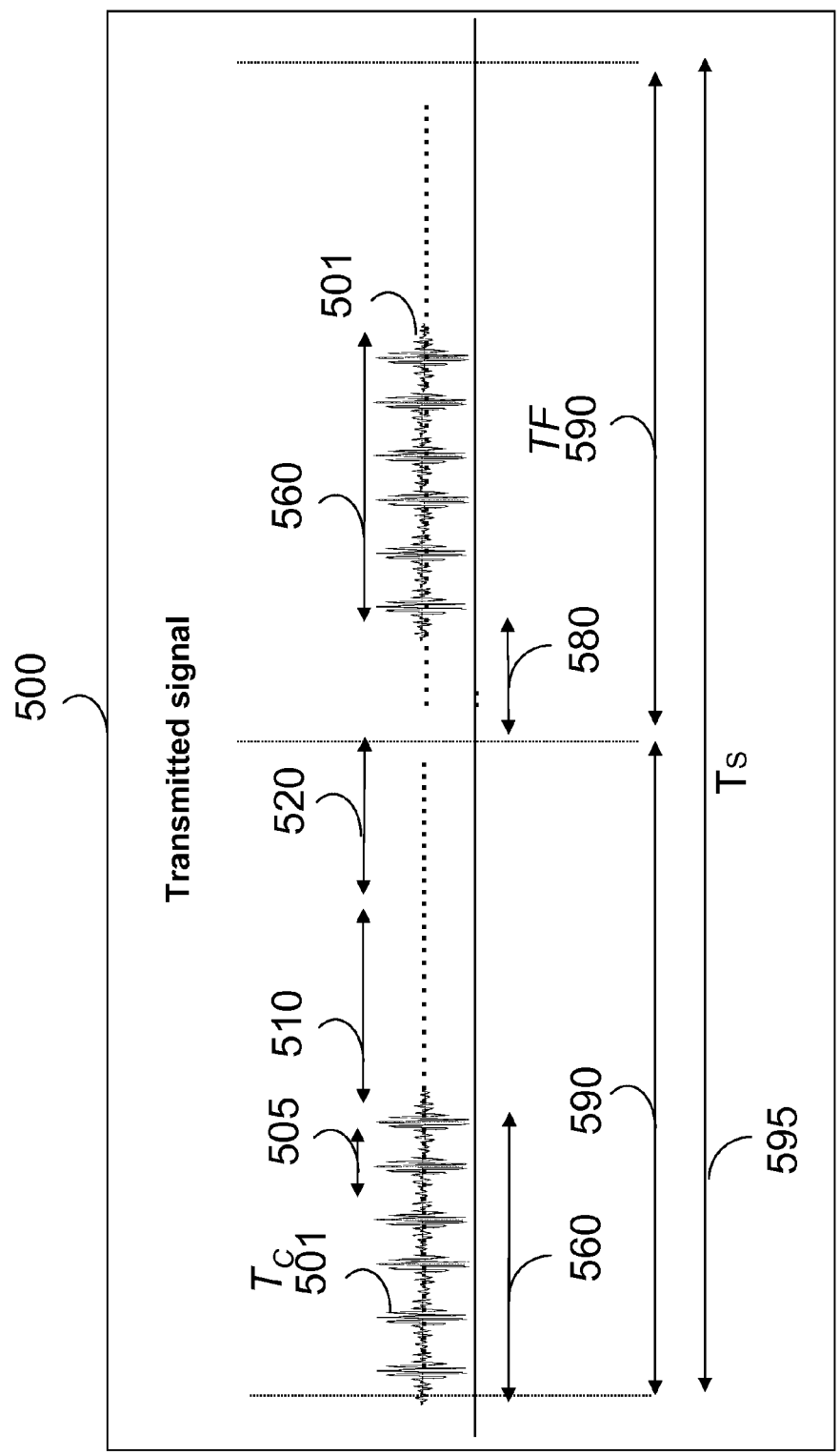
FIG. 5 is a signal waveform according to the invention.

As shown in FIG. 5 for the signal 500, wireless impulse radio transceivers allocate time in terms of symbol time ($T_S$) 595, frame time ($T_F$) 590, chip times ($T_C$) 505, and pulse event interval 560. A symbol is longer than a frame, and a frame is longer than a block, which is longer than a chip. Each symbol can include multiple frames. Each frame can include multiple chips.

As shown in FIG. 5, multiple radio pulses 501 are transmitted in each frame as a signal waveform. The set of pulses occupy the pulse event interval 560 at the beginning of the frame.

A time margin 510 is allocated to each frame after the pulse event interval to reduce the effects of inter-frame interference. Also, an optional multi-path-tolerance time interval 520 is allocated to each frame after the time margin. Thus, for each frame, there is a first interval during which pulses are transmitted, a second interval to reduce IFI, and a third optional interval to reduce multi-path interference. It should be understood that the order of allocating the intervals can be reversed. The basic purpose is to have the set of pulses in one frame not interfere with the pulses in a following frame.

A time-hopping amount 580 and the frame duration can be selected to satisfy a condition that the interval 590 minus the interval 580 is greater than a delay spread of the channel.

The sequence of chips that occupy the pulse event interval 560 is time-hopped in whole during each frame time 590. A symbol interval includes one or more time-hopped frames 590.

Figure 6:
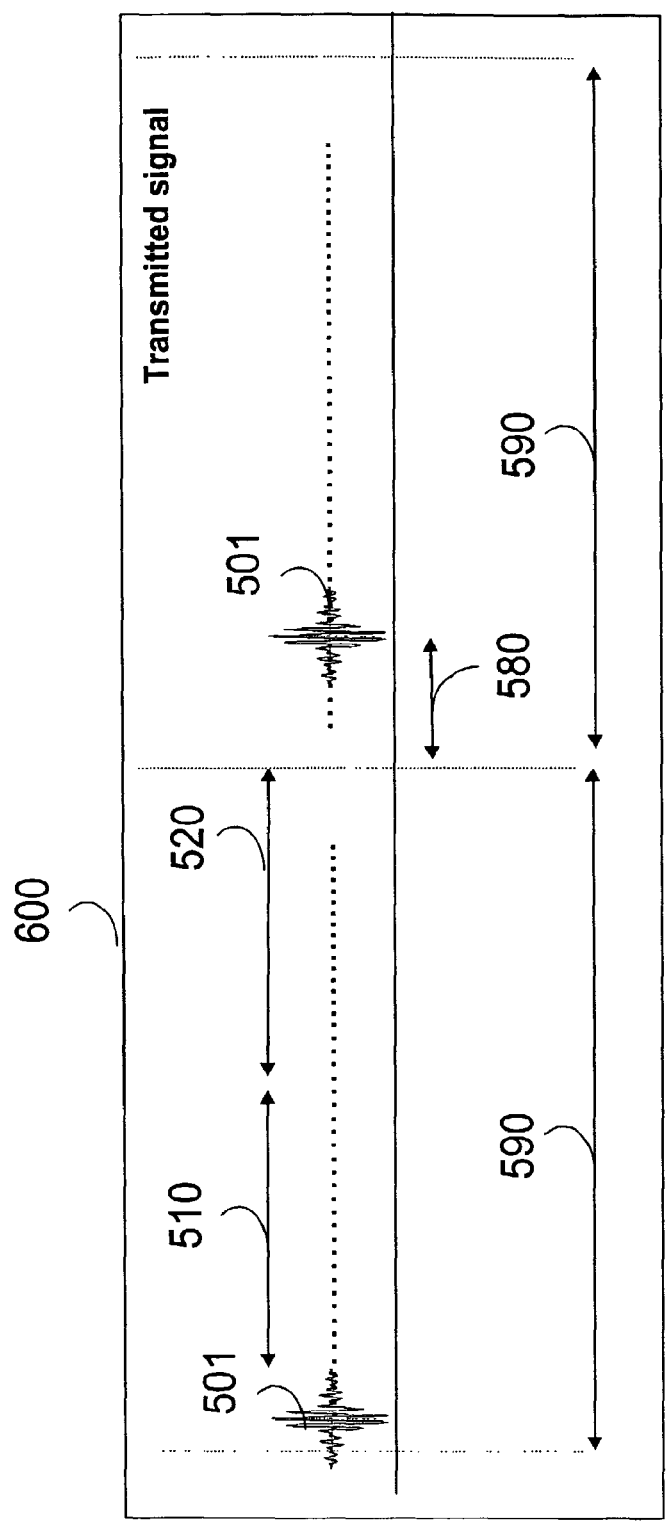
FIG. 6 is a ranging signal waveform according to the invention using a single pulse per symbol interval to support both communications and ranging.
Figure 7:
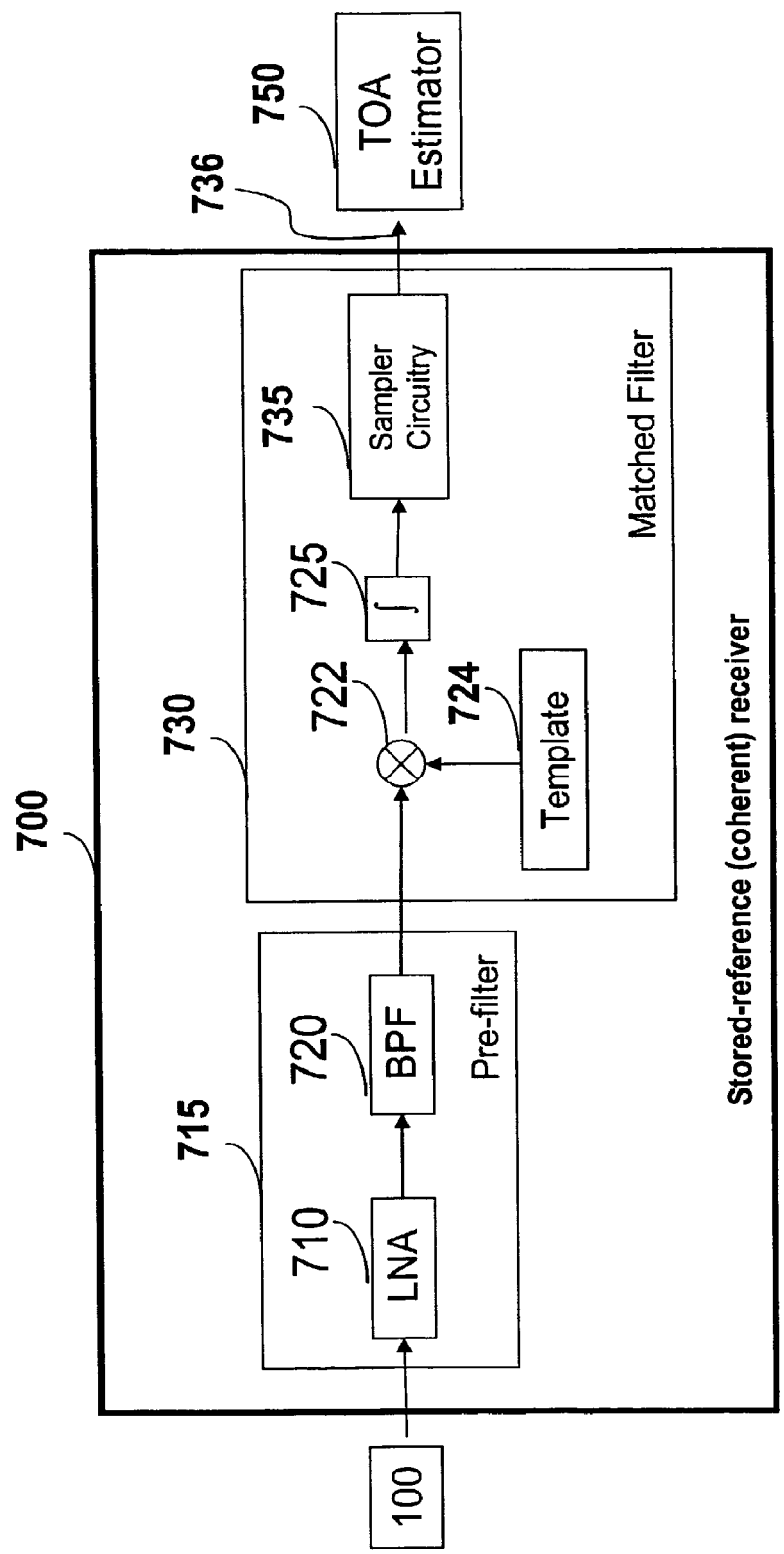
FIG. 7 is a block diagram of a prior art coherent receiver.
Figure 8:
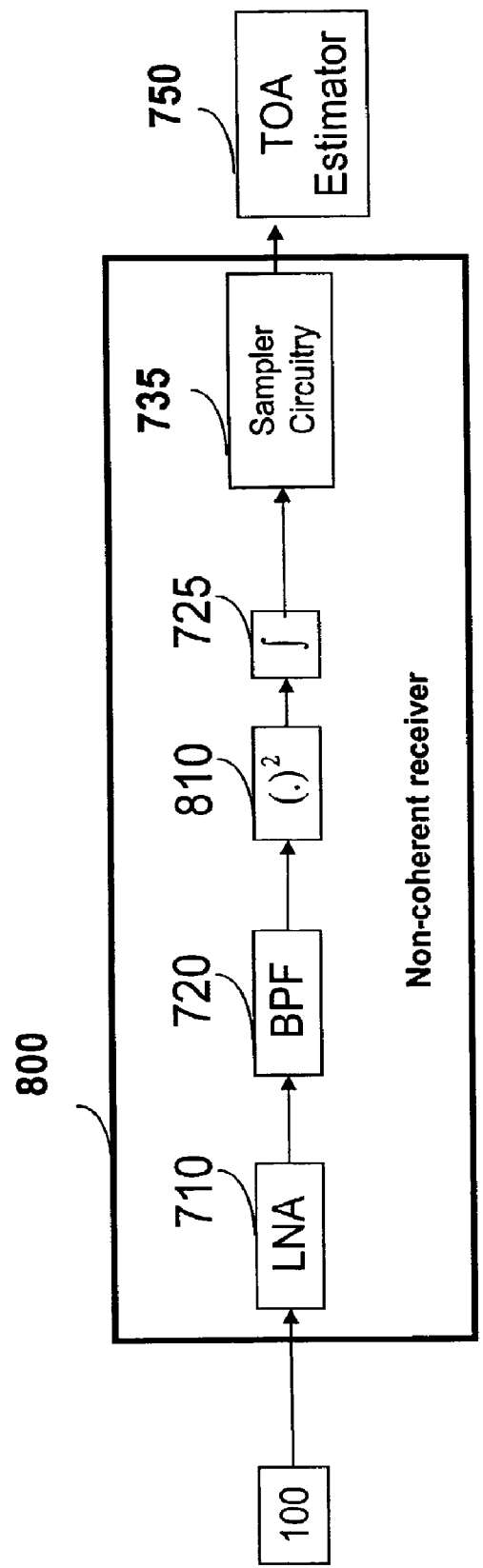
FIG. 8 is a block diagram of a prior art non-coherent receiver.

FIG. 6 shows an alternative wave form 600 where the set of pulses is a single pulse during each frame time. As described above, the pulse event interval to perform time-hopping is allocated for each frame, as well as the multi-path-tolerance time interval 520. The time-hopping amount 580 and the frame duration can be selected to satisfy the condition that the interval 590 minus the interval 580 is greater than the delay spread of the channel.

A pulse repetition frequency (PRF) represents a rate of transmission of the basic pulse pattern (a set of pulses or a single pulse). The PRF can be an integer division of 66 MHz in channels with short delay spread.

The PRF can be generated from the phase locked loop circuit by dividing the center frequency down to the PRF. The PRF can be selected such that the divisions are divisions by two. This simplifies the implementation of the high frequency division elements.

The invention transmits a 'pulse event' 501, i.e., a set of one or more pulses, only during the time margin of each frame time interval 590. In each frame, the pulse event 501 is time-hopped. The received time hopping (TH) impulse radio (IR) signal 500 or 600 can be represented over time t by:

$$r(t) = \sum_{j=-\infty}^{\infty} d_j \omega_{mp}(t - jT_f - c_j T_c - \tau_{toa}) + n(t),$$

where a frame index and a frame duration are denoted by j and $T_f$, and $T_c$ is the chip duration 505, $T_s$ is the symbol duration 595, $\tau_{toa}$ is the TOA of the received signal, and n is additive noise.

Moreover, random-polarity codes $d_j=\{\pm1\}$ are used to introduce additional processing gain for the detection of desired signal, and smooth the signal spectrum.

After the channel impulse response, an effective pulse can be expressed as:

$$\omega_{mp}(t) = \sqrt{E} \sum_{l=1}^{L} \alpha_l \omega(t - \tau_l),$$

where $\omega(t)$ is a received UWB pulse with unit energy, E is the pulse energy, $\alpha_l$ is a fading coefficient, and $\tau_l$ is a delay of the multi-path components, and L is the number of multi-path components.

Additive white Gaussian noise (AWGN) with zero-mean and double-sided power spectral density $N_0/2$ and variance $\sigma^2$ is denoted by n(t). No modulation is considered for the ranging process, but it may be applicable.

In order to avoid catastrophic collisions, and smooth the power spectral density of the transmitted signal, time-hopping codes $c_j^{(k)}$, that can take values in $\{0, 1, \ldots, N_h-1\}$ are assigned to different transceivers. Moreover, random-polarity codes $d_j=\{\pm1\}$ provide additional processing gain for detecting the signal, and smoothing the signal spectrum.

Assume that $T_h$ indicates a length of a unit time-hopping, i.e., a so-called time-hopping resolution, and $N_k$ represents the number of time-hopping units applied to a pulse event within a frame. The length of the total time-hopping becomes $N_k T_h$. The length is generally less than the allocated time margin 510.

The multi-path of a pulse event 560 does not cause inter-frame interference with the next frame. Therefore, the sum of time-hopped interval 580 and the multi-path guard interval 520 in a frame 590 is less than the delay spread of the channel, which is typically around 140 nanoseconds in IEEE 802.15.4a UWB channels.

The length of the frame interval 590 is longer than the time that the radio signal would travel to a specified target at a maximum communication range. For instance, if the maximum range targeted is 60 meters and the speed of the radio wave is 300,000,000 meters/sec, then the radio signal travels 50 meters in 200 nanoseconds. Therefore, the frame interval 590 should be longer than 200 nanoseconds. Otherwise, non-coherent receivers have an ambiguity in the range estimation, because signals from a device placed at 0.1 meter distance would not be distinguished from the signals from a device placed at 60.1 meter distance.

It is also possible to adapt the frame interval according to an initial range measurement. If the range is estimated to be shorter than that the current frame interval, then the length of the frame interval can be decreased. Therefore, the same number of ranging pulse event transmissions, or symbol transmissions take less time.

In the above example, if the channel delay spread is 140 nanoseconds and the pulse event is 10 nanoseconds, then the maximum allowable time hopping interval 580 would be (200−10−140), which is 50 nanoseconds.

Typical values for frame intervals 590 should be greater than the pulse event interval plus the channel spread plus the time hopping margin.

After performing range estimation, if the range is found to be relatively short, the frame interval 590 can be shortened adaptively to decrease the range refinement time. With shorter frame intervals, symbol durations are shorter.

Another objective to time hoping codes is to avoid interfering energy from other transceivers during energy collection from the desired transceiver.

In a CMOS implementations, signal amplitude is typically less than 0.5 volts. Therefore, spreading signal energy over a longer time by using multiple pulses in a pulse event can help lower the per pulse amplitude.

For simplicity, the signal always arrives in one frame duration, i.e., $\tau_{TOA} < T_f$ and there is no inter-frame interference (IFI), i.e., $T_f \geq \tau_L + c_{max} T_c$ where $c_{max}$ is a maximum value of the TH sequence. Note that the assumption of $\tau_{TOA} < T_f$ does not restrict the invention. In fact, it is enough to have $\tau_{TOA} < T_s$ for the invention to work when the frame is large enough and predetermined TH codes are used. Moreover, even if $\tau_{TOA} > \tau_s$, an initial energy detection can be used to determine the arrival time within a symbol uncertainty.

Signal Energy Collection
System Structure and Method Operation

The signal (500 or 600) received from the transmitter 200 is constructed from the pulses 501 and transmitted according to a predetermined time hopping sequence.

Figure 9:
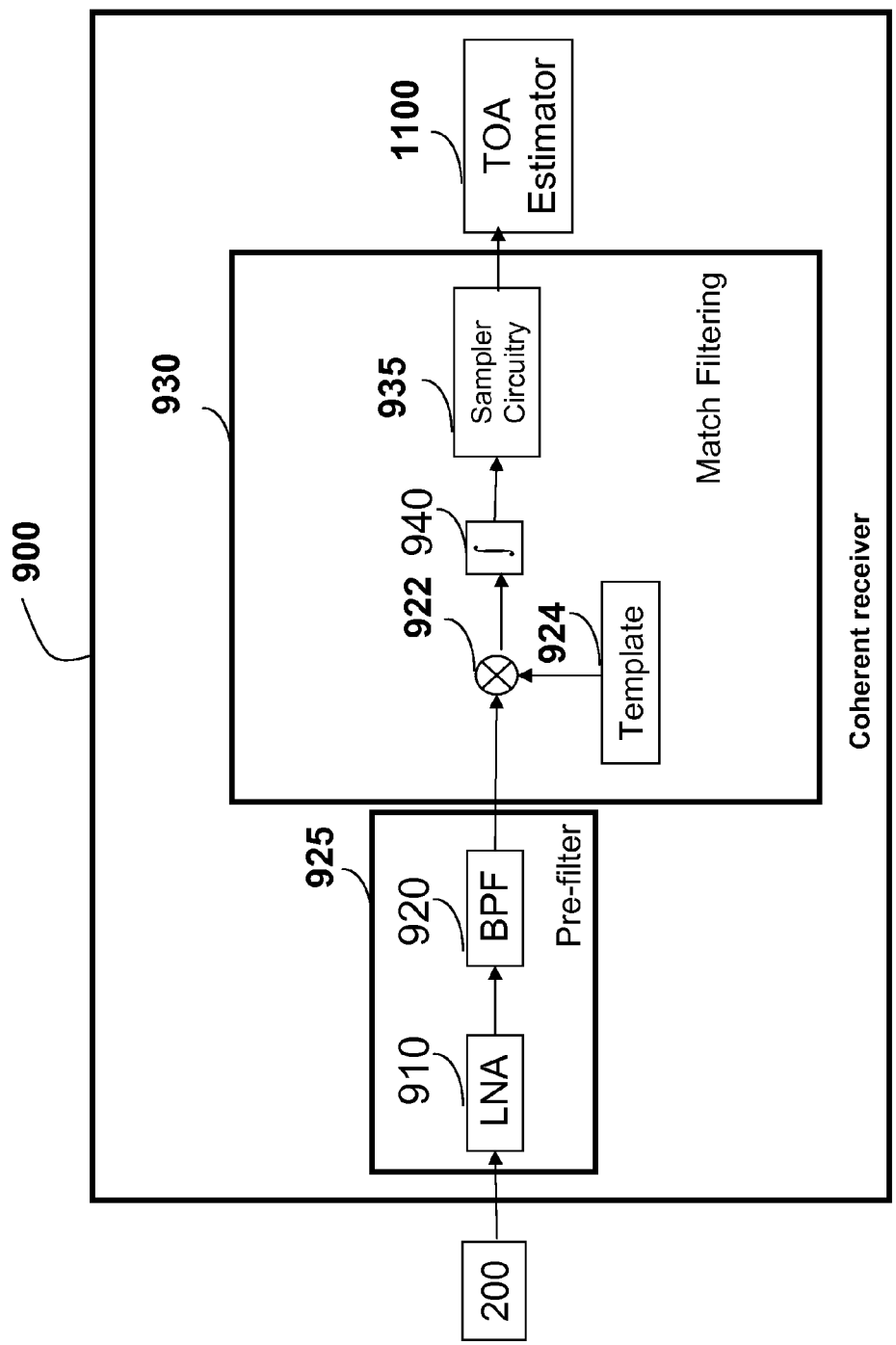
FIG. 9 is a block diagram of coherent receiver according to the invention.

As shown in FIG. 9 for a coherent receiver 900, energy is collected from the received signal according to the same time-hopping sequence to suppress interfering energy from multi-users within the proximity of the target receiver, and to enable better detection of the time of arrival of the signal. The energy collection is described in the related patent application Ser. No. 11/577,106, incorporated herein by reference The time-hopping sequence specifies the position of a pulse event in each frame 590.

The received signal is first passed through a pre-filter 925, which includes of a low noise amplifier 910 and a band-pass filter 920. Then, the signal energy samples can be produced in one the following two ways.

Output of the band-pass filter 920, as shown in FIG. 9, is multiplied 922 with a template signal 924 in the matched filter 930. The template is in the same form as the transmitted signal 500 or 600. The product of the filtered signal and the template is integrated 940. The output of the integrator is sampled 935 to produce observation samples that are to be used to estimate 1100 the time of arrival of the first arriving signal energy.

The sampler 935 samples 'non-overlapping time windows' of the frames, e.g., 4 nanosecond windows. Thus, the input to the TOA estimation are multiple frames, with each frame having sampled energies for the multiple time windows in each frame. The sampled energies are stored in an energy matrix indexed by the frames and the windows. The energy matrix can be viewed as an energy image. Then, conventional image processing edge detection techniques can be applied to the energy image to detect the leading edge of the received signal. The leading edge corresponds to the TOA of the signal. The energy matrix is described in greater detail below.

Figure 10:
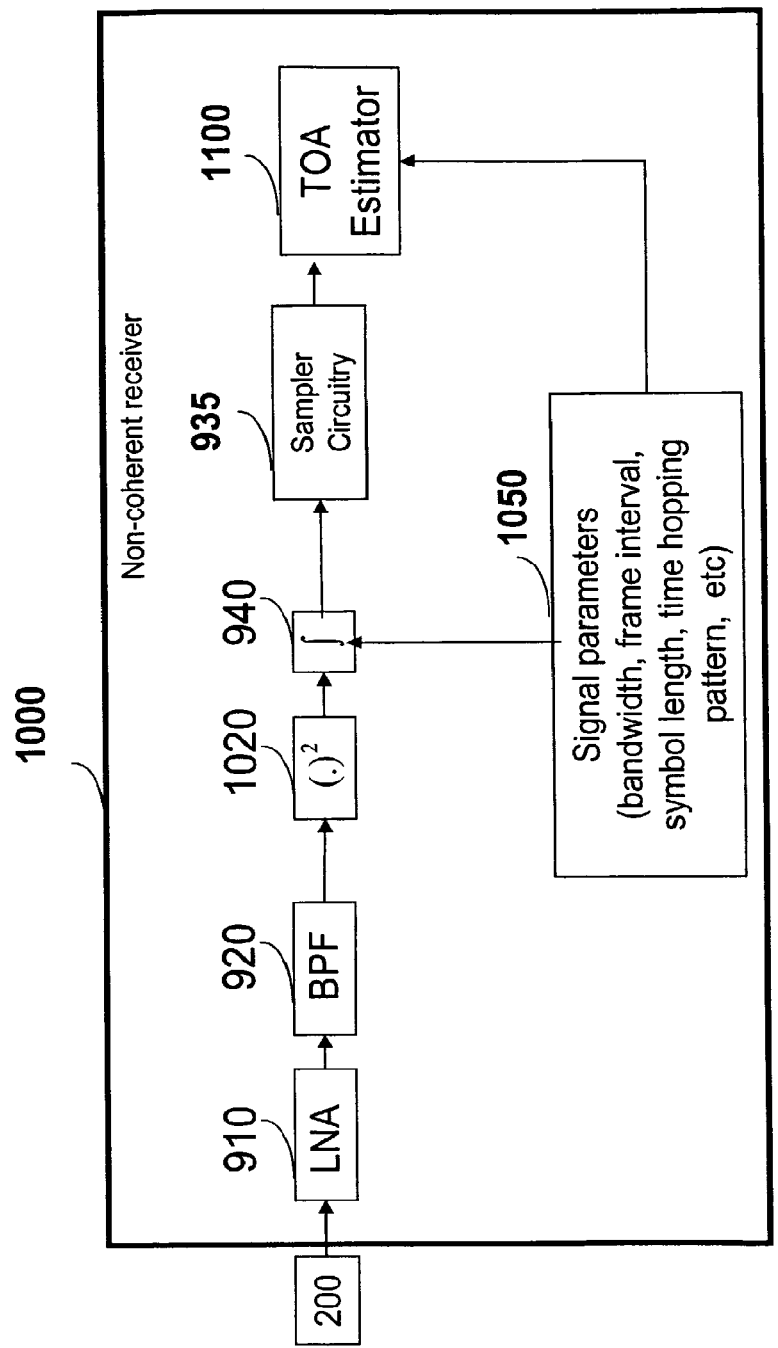
FIG. 10 is a block diagram of a non-coherent receiver according to the invention.

As shown in FIG. 10, a non-coherent receiver 1000 includes a square-law device 1020 and an integrator 940. The integrator uses signal parameters 1050. The output of the integrator 940 is sampled 935 at the desired ranging resolution, e.g., 2 ns, 4 ns etc. The signal parameters 1050 can include signal bandwidth, time-hopping codes, time-hopping resolution, etc. The output samples can be fed into a time of arrival estimator 1100 for detecting the arrival time of the first arriving signal energy path.

TOA Estimation with Energy Matrix Analysis

Figure 11:
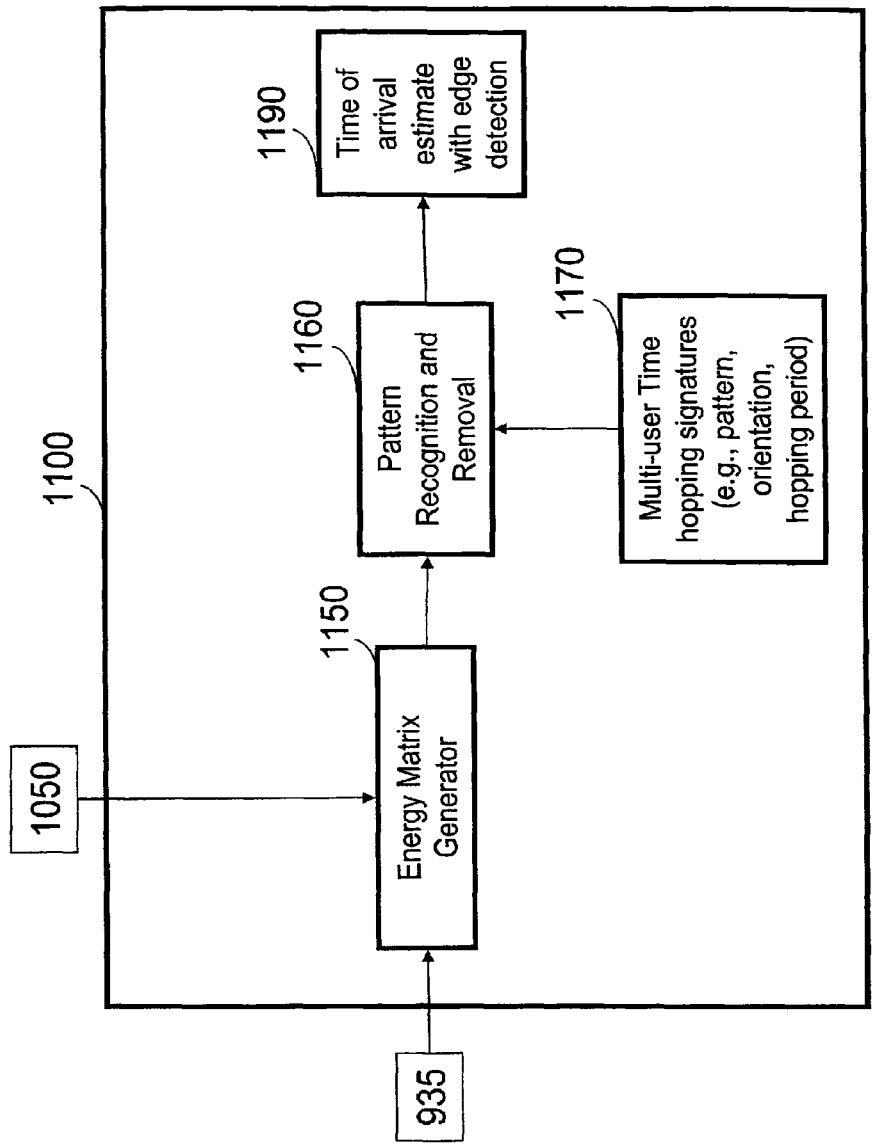
FIG. 11 is a block diagram of the time of arrival estimator using an energy matrix and computer vision techniques according to the invention.

FIG. 11 shows a time of arrival estimator unit 1100 according to the invention. Signal energy from each frame 590 within non-overlapping windows is collected. The window length is equivalent to the integrator 940 interval. For example, if the frame interval 590 is 200 nanoseconds, and the window length is 4 nanoseconds, then there are 200/4=50 energy samples for each frame. Therefore, if we assume signal energies are collected over ten frames, then there are 10*50=500 energy samples.

These collected energy samples from 935 and signal parameters 1050, such as the time hopping code of the transmitter are entered into an energy matrix generator 1150. The energy matrix generator constructs a matrix from the energy samples according to the signal parameters 1050. The size of the energy matrix is to the number of windows in a frame times the number of frames from which the energy samples are collected. According to the above example, the size of the energy matrix would is 10×50 or 50×10, depending on an orientation of the energy matrix. The matrix can be stored in a memory of the receiver.

If the intensity values of the energy values in the 2D energy matrix are considered as 'pixel intensity values, then the energy matrix can be view as an 'energy image' of the received signal. In this case, known image processing techniques can be applied to the energy matrix or image. Such techniques include edge detection, pattern recognition, motion analysis, histogram statistics, noise reduction, and the like. Thus, the invention, provides a novel way of visualizing and analyzing radio signals using image processing techniques.

TOA Estimation Using Computer Vision Techniques

After the energy matrix is constructed, the matrix is provided to the pattern recognition and removal unit 1160. If time-hopping codes of other potentially interfering transmitters are known before hand, these codes are also fed into the pattern recognition and removal unit 1160. Then, the pattern recognition and removal unit searches for energy patterns in the energy matrix. If the unit detects a pattern that corresponds to the time-hopping code 1170 of interfering transmitters, the unit removes the pattern partially or fully from the energy matrix. Partial removal is preferred in cases that the interference pattern overlaps with the pattern of the transmitter for which the ranging is being performed. In any case, the removal process provides an enhanced energy matrix.

Then, the output of the pattern recognition and detection unit is entered into a time of arrival estimator with edge detection unit 1190. This unit 1190 applies image edge detection techniques on the enhanced energy matrix provided by the unit 1160.

Figure 12:
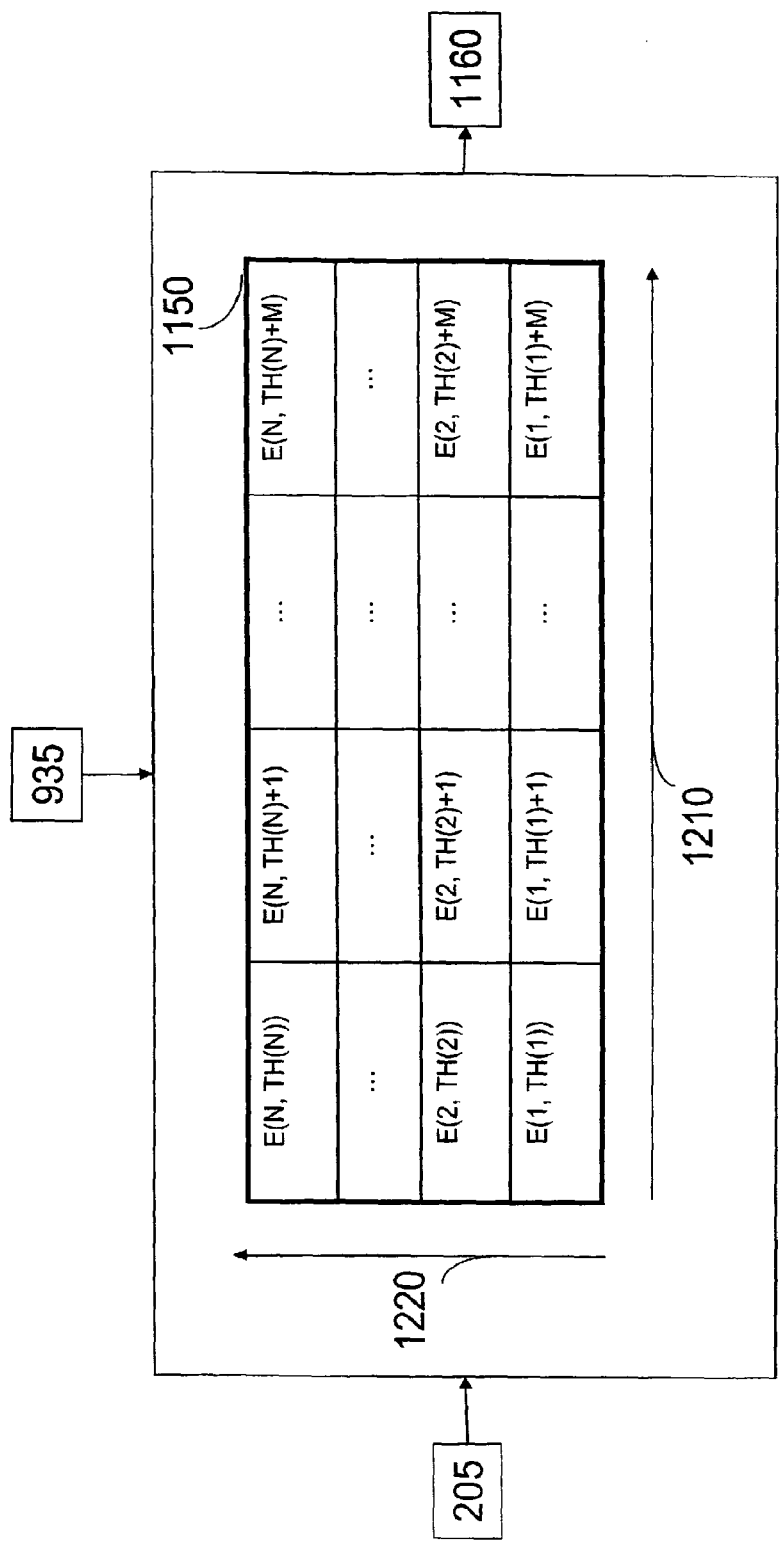
FIG. 12 is a block diagram of energy collection and matrix construction according to the invention.

FIG. 12 illustrates one of many ways of constructing the energy matrix 1150 with collected energy samples from the sampler 935. Assume that each of N frame intervals 590 includes M non-overlapping energy windows. The energy intensity corresponding to window j of frame i is denoted as $E(i, j)$, where $1 \leq j \leq M$, and $1 \leq i \leq N$. Therefore, if N frames are transmitted for each symbol, and in each frame has M non-overlapping time windows, then the size of the energy matrix or image is M×N or N×M, depending on an orientation of the energy matrix.

For the desired transmitter, $TH(m)$ indicates the time-hopped interval in frame m, where $TH(m)$ is in units of the number of energy windows and m is an integer.

As shown in FIG. 12, while constructing the image matrix 1150, the time hopping sequence of the transmitter is taken into consideration. An index 1210 is for the frames an index 1220 is for the windows in each frame, and $E(i,j)$ is the energy intensity for window position i of frame j. On way to interpret the energy matrix that the index i 1210 correlates to a time estimate, and the index j, refines the time estimate.

The received signal can include multiple symbols. Therefore, the same time-hopping code is applied to the frames of each symbol. With the construction of the energy matrix according to the above method, collected signal energies 1280 from a desired user form a straight column for each window position that contains multi-path signals as shown FIGS. 13A-B.

Figure 13:
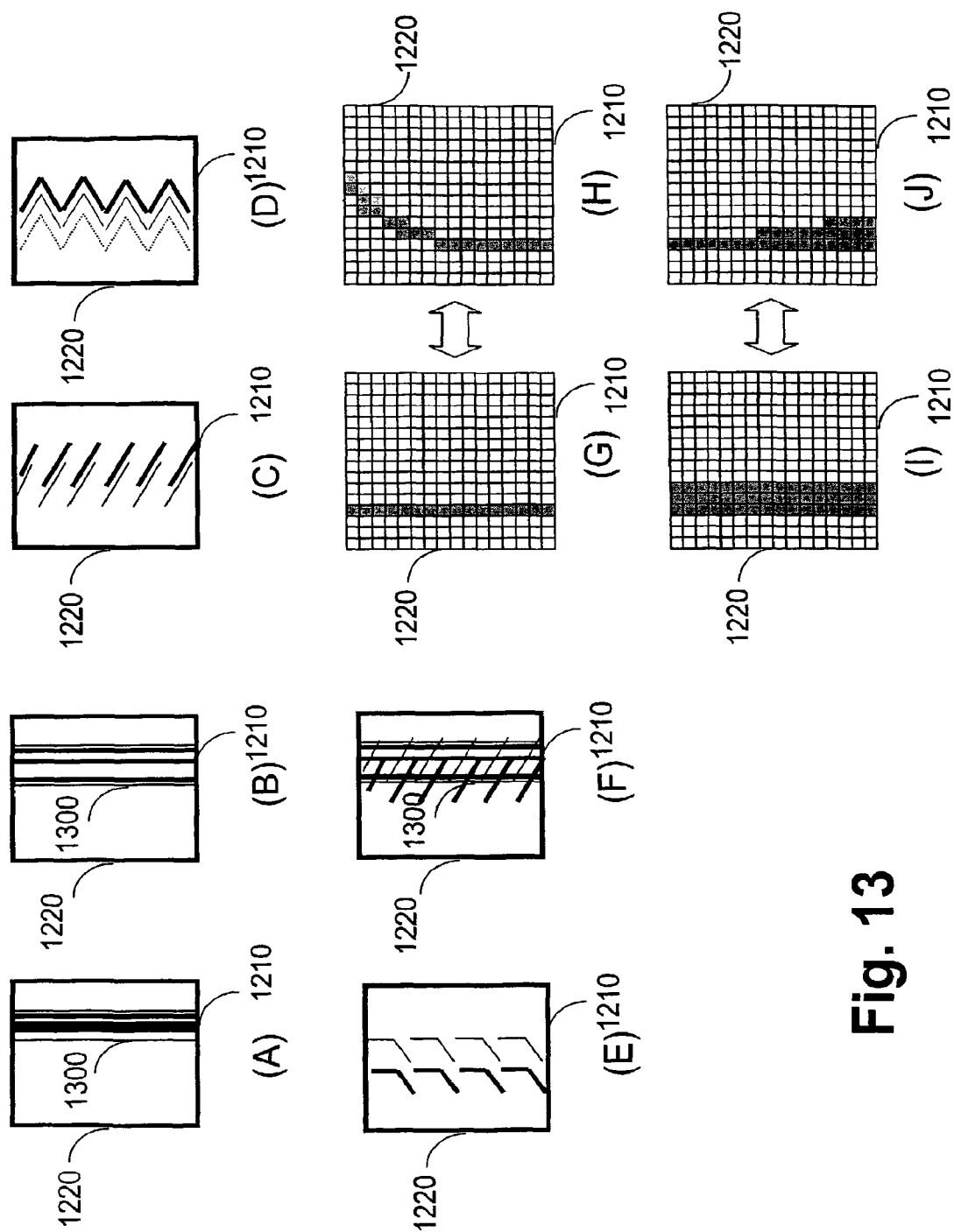
FIGS. 13A-J are illustrations of example energy matrix patterns that can be enhanced and analyzed according to the invention.

FIGS. 13A and 13B show the pattern due to desired user's signal energies in which column 1300 is a first energy arrival column. Each other column illustrate energies from multi-paths of the desired user's signal. It is important to note that received energies always form a straight column, or row always depending on the orientation of the frame index and window index, after in matrix construction. On the other hand, interfering energy from other transmitters have different patterns, which are dependent on their time-hopping code.

FIG. 13C-E show example energy intensity patterns due to interfering signals.

FIG. 13F shows energy patterns of the received signal from the transmitter and interfering patterns.

FIG. 13G shows an energy matrix when a transmitter and receiver are stationary with respect to each other.

FIG. 12H shows an energy matrix when a transmitter and a receiver are moving away from each other at an increasing speed;

FIG. 13I shows an energy matrix when a transmitter and receiver are stationary and there is some dense multipath interference;

FIG. 13J shows an energy matrix when a transmitter and receivers are approaching each other.

Figure 14:
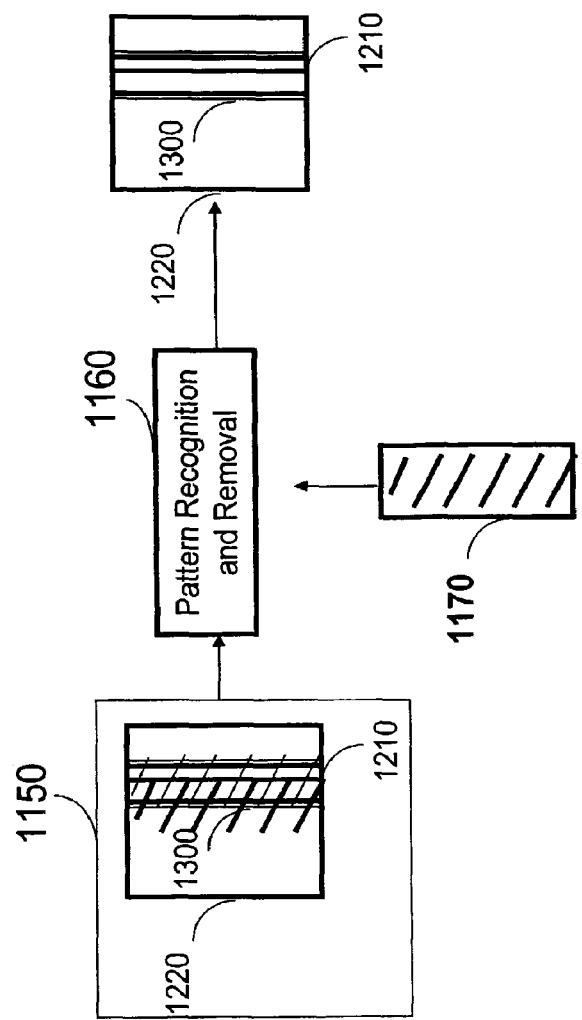
FIG. 14 is a flow diagram of a pattern recognition and removal unit.
Figure 15:
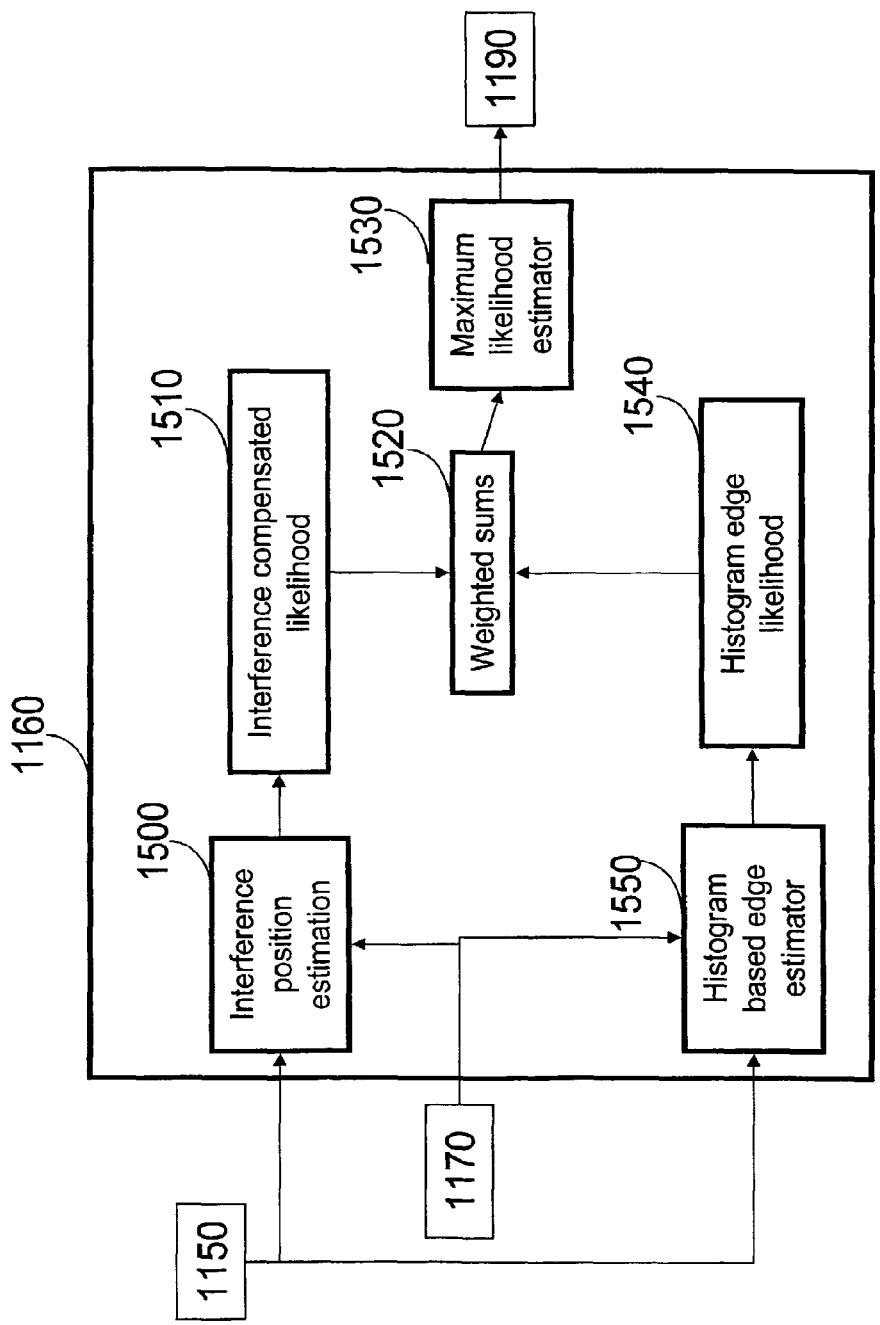
FIG. 15 is a detailed flow diagram of the pattern recognition unit.

FIG. 14 show the details of the pattern recognition and removal unit 1160. The input to 1160 is the energy matrix 1150 that stores energies from the desired transmitter, and energies from interfering transmitters.

If the time-hoping code of an interfering transmitter is known, then that pattern 1170 can be pre-computed and stored in the receiver. The pattern recognition and removal unit 1160 takes the interfering pattern 1170 as an input attempts to detect existence of the same pattern in the energy matrix. If interfering pattern is detected, then it can be removed and the enhanced energy matrix is provided 1160.

Again, depending on the orientation of the matrix, the collected energies can be a set of rows in the energy matrix.

Then, the range estimation can be performed by column (vertical) edge or row (horizontal) edge detection. As stated above, the energy matrix can be viewed as an energy 'image'. Therefore, any prior art image edge detection method can be applied to detect the first energy column (or row) index of the energy matrix.

Using the energy matrix, it is also possible to detect multi-user interference patterns, without knowing the time-hopping signatures or codes 1170.

In another application, the time hopping sequence can be changed adaptively to avoid multi-user interference in data communication and ranging applications.

Figure 19:
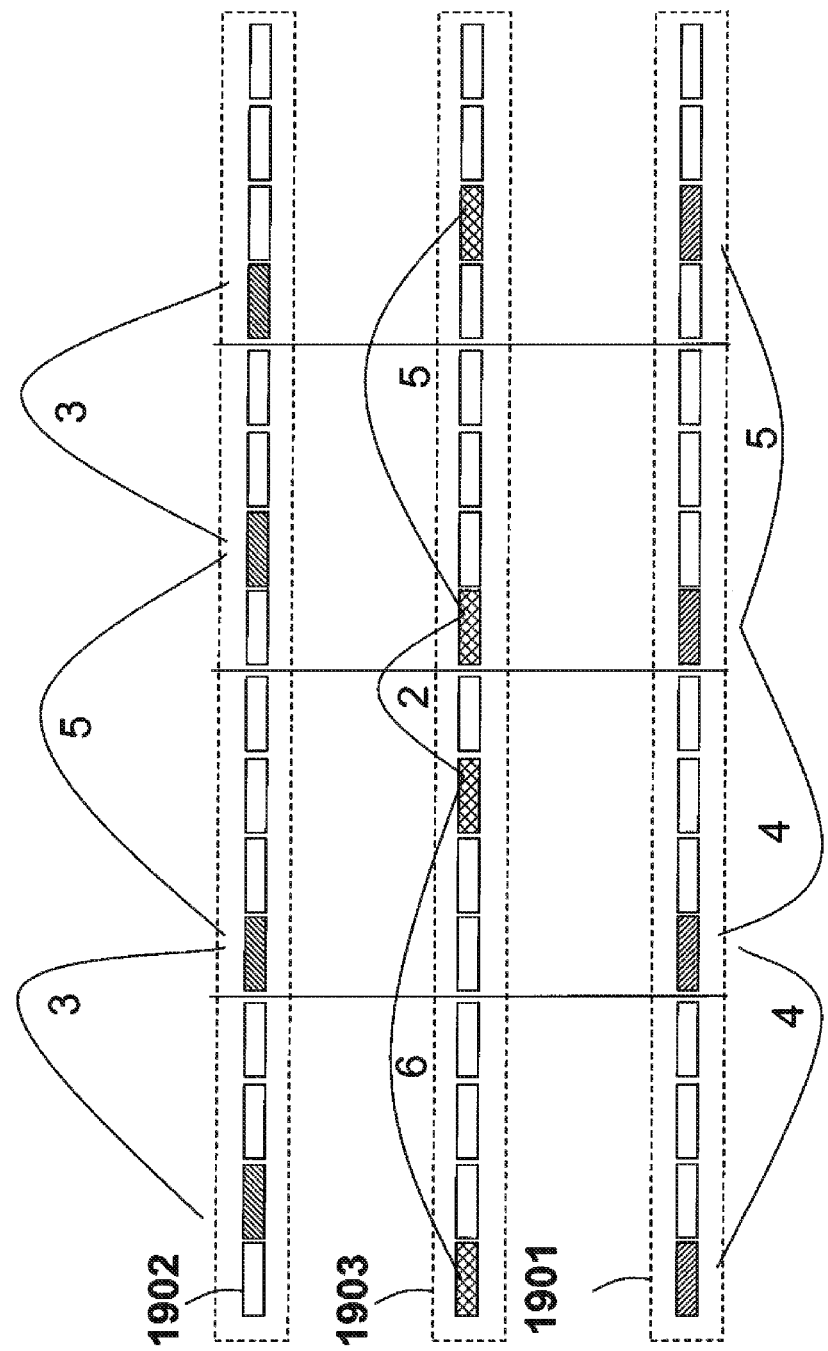
FIG. 19 is a timing diagram of changing time-hopping codes.

FIG. 19 shows a transmitter's time-hopping code-1 {1,1, 1,2} 1901 with hops 4-4-5, being changed adaptively to a time-hopping code-2 {2,1,2,1} 1902 with hops 3-5-3, while an interfering time-hopping code-3 {1,3,1,2} 1903 remains the same.

Figure 20:
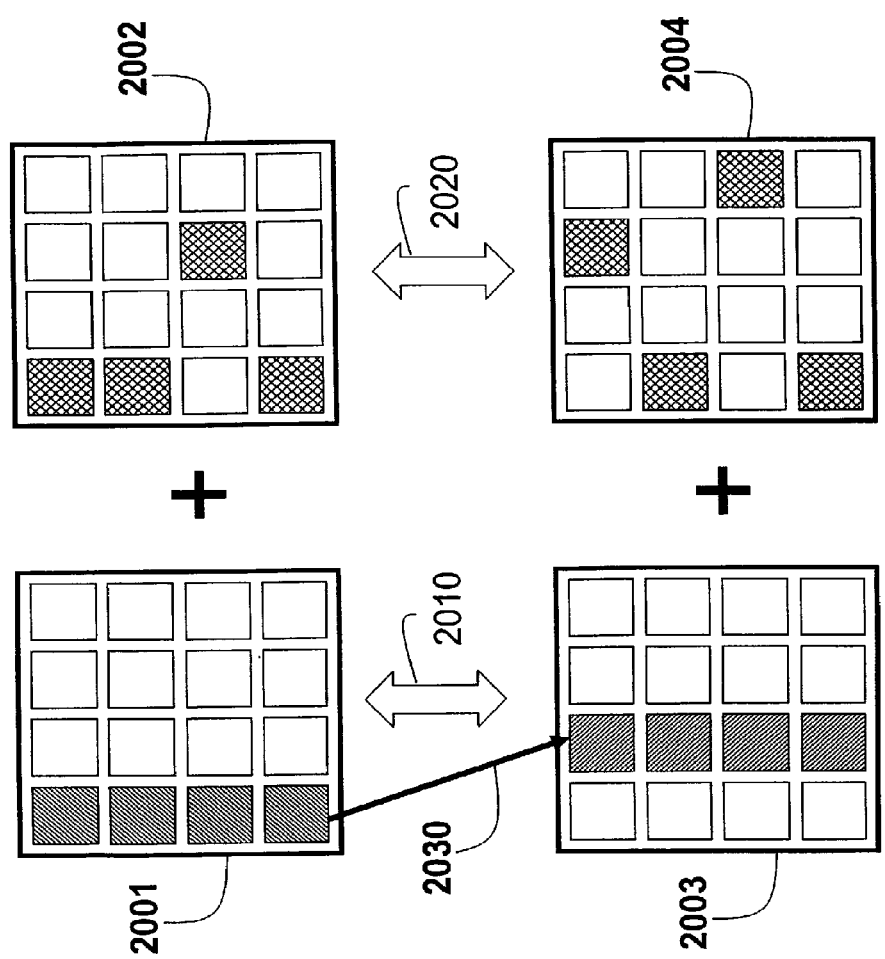
FIG. 20 is a block diagram corresponding to the changing time-hopping codes of FIG. 19.

FIG. 20 shows corresponding stylized energy matrices. Matrix 2001 for just code-1 1901, matrix 2002 for code-1 1901 and code-3 1903, matrix 2003 for just code-2 1902, and matrix 2004 for code-2 1902 and code-3 1903. Note, that when the transmitter's code is changed 2010 while the interfering code is constant, the interference pattern in the energy matrix changes 2020. Note also, by comparing matrices 2001-2002, that the position of the leading edge, as represented by a column in the energy matrix, shifts according to the starting point of the energy collection.

Therefore, by using an optimum time-hopping code adjustment, the distortion on the desired transmitter's energy, due to interfering energy patterns can be avoided or at least decreases.

Below is a detailed description of one embodiment of the pattern recognition and removal unit 1160.

To recognize and remove patterns, in the unit 1160, two signal position likelihoods are estimated 1500, namely an interference compensated likelihood 1510 that evaluates a location of the interference pattern in the energy matrix 1150 columns and a histogram edge likelihood 1540 that detects an edge location. We first estimate the location of interference pattern using the given time hopping pattern and period values 1170. This gives us the interference compensated likelihood. Then, we apply a histogram based edge estimator 1550 to obtain the histogram edge likelihoods 1540.

We apply a maximum likelihood estimator 1530 to fuse the results of the previous likelihood computations. The maximum likelihood estimator 1530 registers the estimated likelihoods 1540 and 1510 along the energy window index. We aggregate the likelihood values of the both estimations by either adding or multiplying the corresponding values. Alternatively, we select the maximum of the weighed sum after multiplying both likelihoods with predetermined weights.

Figure 16:
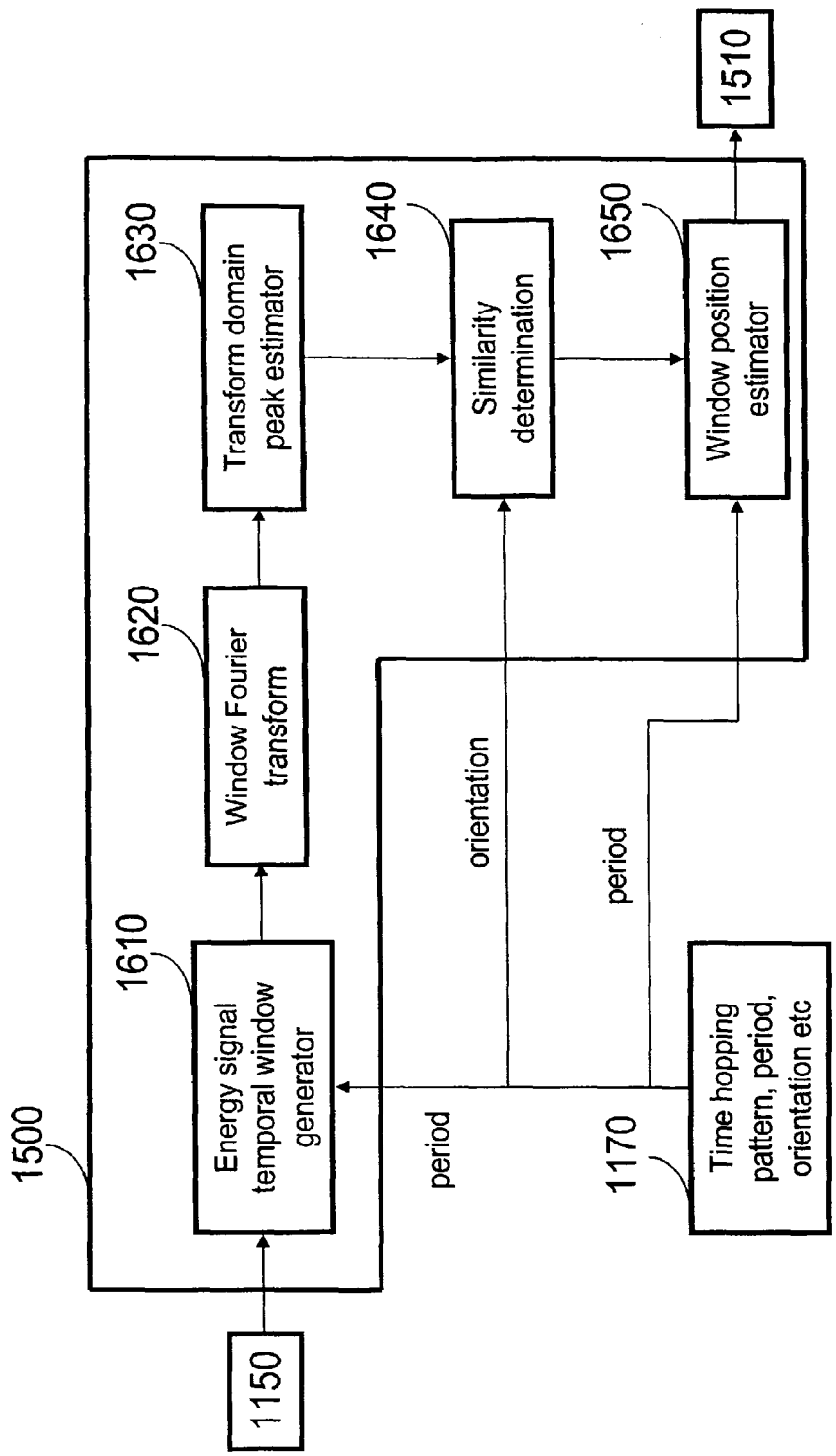
FIG. 16 is a flow diagram of energy matrix being processed in a frequency domain for estimating the time of arrival of the direct path.
Figure 17:
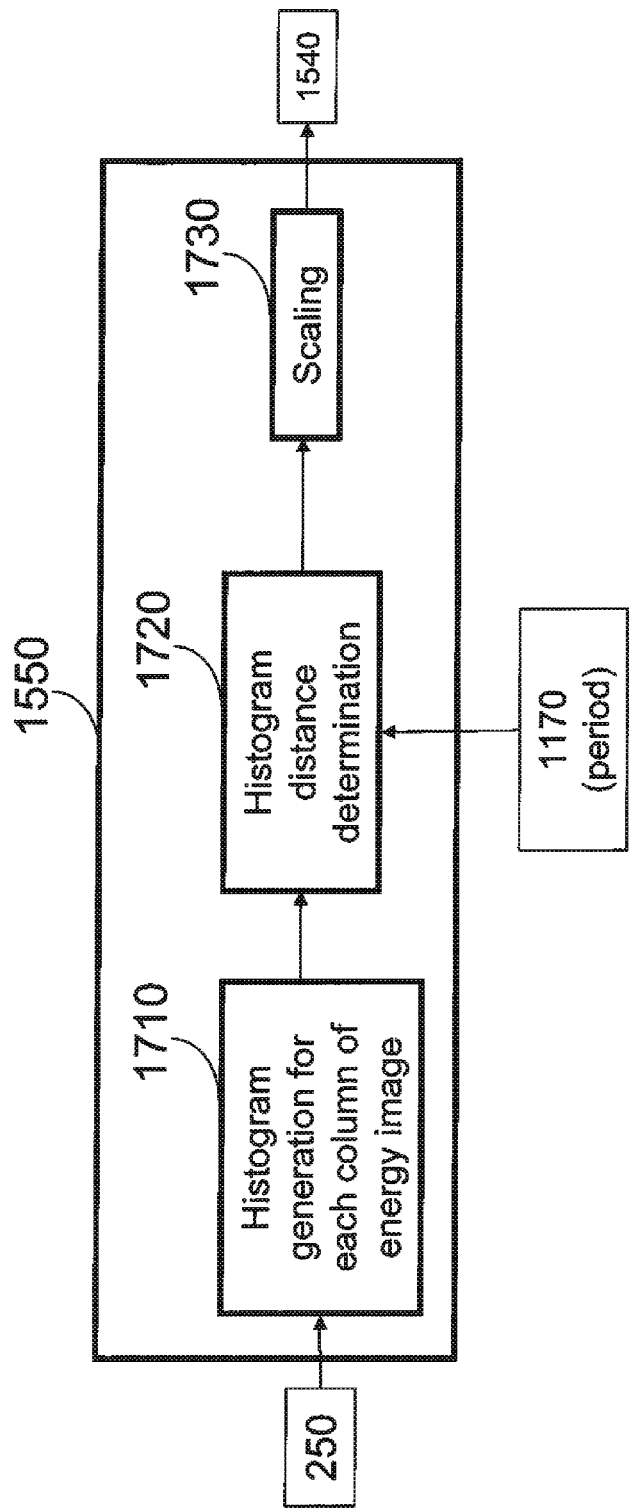
FIG. 17 is a flow diagram of a histogram edge likelihood estimation according to the third embodiment of a pattern recognition unit according to the invention.

As shown in FIG. 16, to estimate interference, we generate overlapping 2-dimensional temporal windows (index and band) 1610 from the energy signal using the time hopping period. The window size is assigned according to the period value. We apply a 2-dimensional Fourier transform 1620 to each of these windows. In the sampled window includes interference, the Fourier transform 1620 has a step response in a direction along an orientation of the time hopping pattern.

Therefore, we add the values of the Fourier transform coefficients along each direction in the transform space starting from the origin and find the orthogonal direction that gives the highest value 1630 or 'peak'. Then, we assign the highest value to the window index in the window similarity score determination 1640 step. The index that has the highest score indicates the position of the interference. To obtain the interference compensated likelihood, we inversely scale the window similarity scores.

The second likelihood, which is the histogram edge likelihood 1540, is obtained by analyzing the distribution of energy in each band. We generate a histogram of energy values at each window index or a multitude of index positions in step 1710. Then, we compare each of the histograms by determining a histogram distance norm in 1720, and assign the distance to each index. The number of histograms in comparison is determined by the given time hopping period. The larger histogram distance values indicate possible edges in the energy signal. Finally, we normalize the distance function in step 1730.

Figure 18:
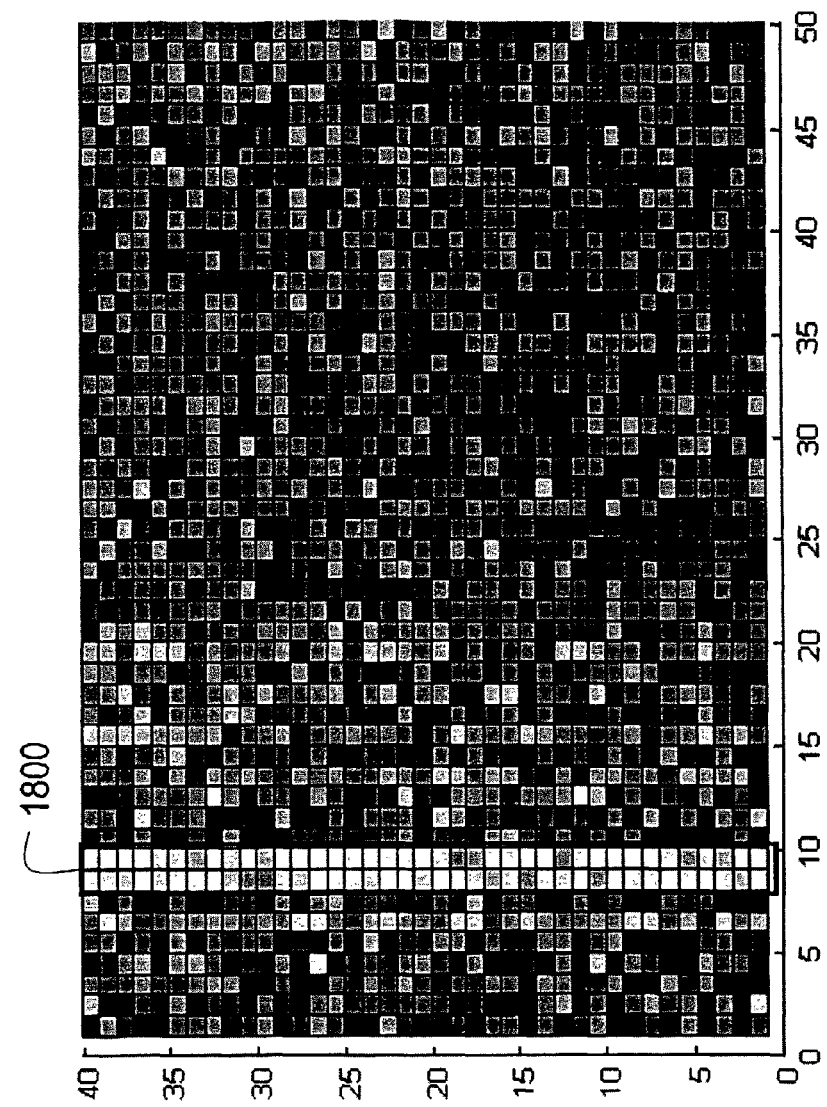
FIG. 18 is an energy image corresponding to an energy matrix according to the invention.

FIG. 18 is an example energy image corresponding to an energy matrix constructed from a received ultra-wideband via a wireless channel according to the IEEE 802.15.4a. It should be clear that the TOA can be estimated from the leading edge 1800 using conventional image processing techniques.

TOA Estimation Using Time Series Hypothesis Techniques

When the energy window index is the horizontal axis and the frame 590 index is the vertical axis of the energy matrix, each column can be treated as time-series data. When there is no radio signal present, the columns of energy values correspond to noise. When there is a radio signal, corresponding column contain signal and noise energies. Therefore, conventional hypothesis testing methods 2160 can be applied to each column of the energy matrix 1150 to test whether a column contains noise only, or whether the column contains signal and noise.

Assume the following are two hypotheses:
H0: noise only, with unknown or unknown variance; and
H1: signal and noise, with unknown signal amplitude)
The time series hypothesis testing unit 2160 performs the following steps:
1) Take the first column (or row) data as a time series data
2) Test whether the data belong to the hypothesis H0
3) If YES,
Switch to the next column (or row)
Go to Step 2
4) If NO,
mark the column (or row) as the leading edge.

Figure 21:
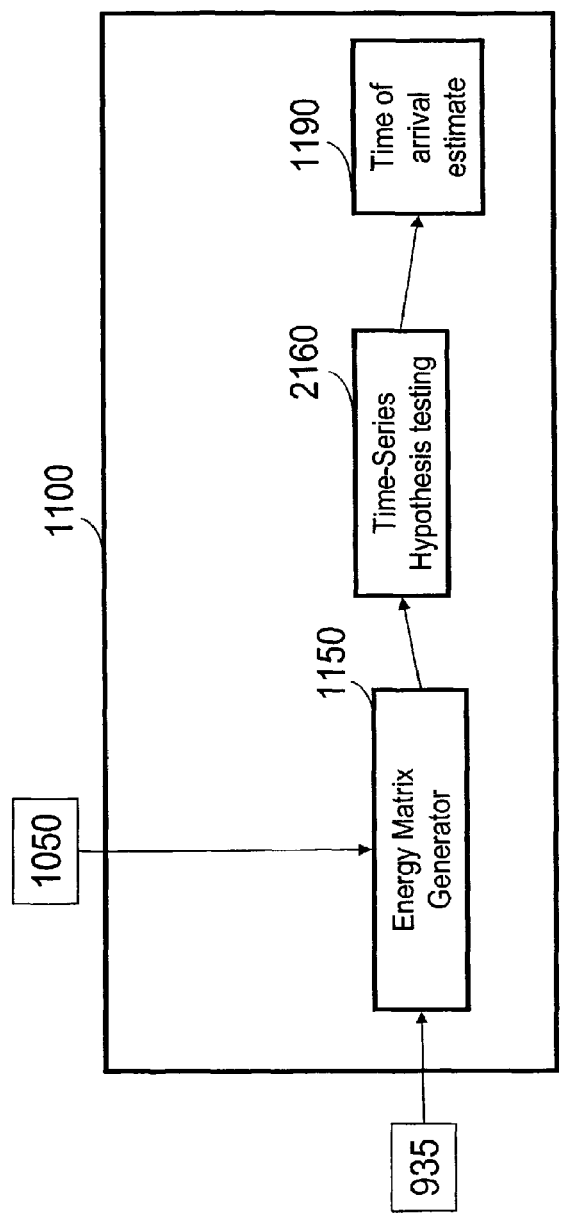
FIG. 21 is a block diagram of the time of arrival estimator using an energy matrix and time-series hypothesis analysis techniques according to the invention.

This time series hypothesis testing technique illustrated in FIG. 21 does not necessarily need to know the time hopping signatures 1170 in a multi-user environment.

During the hypothesis testing, the noise variance can be assumed to be unknown and the signal amplitude can be assumed to be unknown. If the noise variance can be estimated by any other means, then the hypothesis H0 can be changed to be noise with known variance. The details of hypothesis testing methods can be found in Steven M. Kay "Fundamentals of Statistical signal Processing: Detection Theory," volume 2, Prentice Hall Signal Processing Series, 1998.

It is to be understood that various other adaptations and modifications may be made within the spirit and scope of the invention. Therefore, it is the object of the appended claims to cover all such variations and modifications as come within the true spirit and scope of the invention.

We claim:

1. A method for analyzing a received radio signal, comprising the steps of:
   receiving a radio signal via a channel from a transmitter, the radio signal including a plurality of frames representing a transmitted symbol, wherein the received signal is an ultra-wideband time-hopped impulse-radio signal;
   sampling, for each frame, an energy of the radio signal during a plurality of non-overlapping time windows;
   storing the sampled energies in an energy matrix indexed by the number of frames and the number of time windows in each frame to analyze the radio signal, wherein the steps are performed in a receiver, and
   estimating, from the energy matrix, an interference compensated likelihood that evaluates a location of an interference pattern in the energy matrix; and
a histogram edge likelihood that detects an edge in the energy matrix.

2. The method of claim 1, in which the transmitted symbol is a ranging symbol.

3. The method of claim 1, further comprising:
   applying image analysis techniques to the energy matrix.

4. The method of claim 1, further comprising:
   analyzing the energy matrix to detecting a leading edge of the received radio signal, the leading edge corresponding to a time of arrival of the radio signal.

5. The method of claim 4, in which the energy matrix is treated as an energy image, and the leading edge is detected by an edge detector operating on the energy image.

6. The method of claim 5, in which the edge detector uses features of the received radio signal.

7. The method of claim 1, in which the energy matrix is constructed according a time hopping code.

8. The method of claim 1, further comprising:
   applying edge detection to the energy matrix.

9. The method of claim 1, further comprising:
   applying pattern recognition to the energy matrix.

10. The method of claim 1, further comprising:
    applying motion analysis to the energy matrix.

11. The method of claim 1, further comprising:
    applying histogram statistical analysis to the energy matrix.

12. The method of claim 1, further comprising:
    applying noise reduction to the energy matrix.

13. The method of claim 12, in which the noise reduction is according to time-hopping codes of interfering radio signals.

14. The method of claim 13, further comprising:
    detecting whether the transmitter and the receiver are approaching each other by analyzing the energy matrix.

15. The method of claim 1, further comprising:
    visualizing the energy matrix.

16. The method of claim 1, further comprising:
    determining whether the transmitter and the receiver of the radio signals are stationary with respect to each other by analyzing the energy matrix.

17. The method of claim 1, further comprising:
    determining whether the transmitter and the receiver of the radio signals are moving away from each other at an increasing speed by analyzing the energy matrix.

18. The method of claim 1, further comprising:
    detecting dense multipath interference by analyzing the energy matrix.

19. The method of claim 1, further comprising:
    changing adaptively a time-hopping code of the radio signal by analyzing the energy matrix.

20. The method of claim 1, further comprising:
    removing multi-user interference from the energy matrix using a pattern recognition technique.

21. The method of claim 1, in which the location of the interference pattern is according to time hopping pattern.

22. The method of claim 1, further comprising;
    generating a plurality of temporal windows from the energy matrix; applying Fourier transform to each of the windows;
    accumulating values of Fourier transform coefficients along orthogonal direction of a time hopping pattern in a transform space starting from an origin of the energy matrix; and
    assigning inversely scaled accumulated values to obtain the interference compensated likelihood.

23. The method of claim 1, further comprising;
    determining a histogram of energy matrix values at each window index;
    determining a histogram distance between consecutive histograms;
    assigning the histogram distances to the window index values to obtain the histogram edge likelihood; and
    normalizing the histogram edge likelihood.

24. The method of claim 23, further comprising;
    determining the histogram of energy matrix values at multiple window index positions.

25. The method of claim 24, further comprising;
    assigning a number of histograms with respect to the time hopping period.

26. The method of claim 1, further comprising;
    multiplying the interference compensated likelihood with a first weight;
    multiplying the edge histogram likelihood with a second weight;
    aggregating the histogram edge likelihood values along the energy matrix index; and
    assigning a maximum of a weighed sum as an estimated location of the radio signal.

27. The method of claim 1, in which a time window axis is horizontal in the energy matrix and a frame axis index is a vertical axis, and further comprising:
    treating each column in the energy matrix as time-series data.

28. The method of claim 27, further comprising:
    applying hypothesis testing methods to the time series to determine whether a particular column in the energy matrix corresponds to noise or the radio signal.

* * * * *